United States Patent [19]
Matsumura et al.

[11] Patent Number: 5,935,732
[45] Date of Patent: Aug. 10, 1999

[54] HYDROGEN ABSORBING ELECTRODE AND ITS MANUFACTURING METHOD

[75] Inventors: Yuichi Matsumura; Takehito Bogauchi; Masuhiro Ohnishi; Kengo Furukawa; Hiroe Nakagawa; Toshiki Tanaka; Minoru Kuzuhara; Masahiko Oshitani, all of Osaka, Japan

[73] Assignee: Yuasa Corporation, Osaka, Japan

[21] Appl. No.: 08/872,192

[22] Filed: Jun. 10, 1997

Related U.S. Application Data

[63] Continuation of application No. 08/545,709, Oct. 23, 1995, abandoned.

[30] Foreign Application Priority Data

| Feb. 25, 1994 | [JP] | Japan | 6-27189 |
| Jun. 30, 1994 | [JP] | Japan | 6-149142 |
| Oct. 31, 1994 | [JP] | Japan | 6-266564 |
| Nov. 9, 1994 | [JP] | Japan | 6-274822 |
| Nov. 11, 1994 | [JP] | Japan | 6-276899 |

[51] Int. Cl.$^6$ .................................................. H01M 4/38
[52] U.S. Cl. .................... 429/218.2; 429/59; 420/900; 29/623.5
[58] Field of Search ........................ 420/900; 29/623.5; 429/218.2, 59

[56] References Cited

U.S. PATENT DOCUMENTS

4,859,413   8/1989   Harris et al. .

FOREIGN PATENT DOCUMENTS

0 271 043   6/1988   European Pat. Off. .
0 645 833   3/1995   European Pat. Off. .

OTHER PUBLICATIONS

Patent Abstracts of Japan, vol. 017, No. 668 (E–1473), Dec. 9, 1993 & JP–A–05 225975 (Furukawa Battery Co Ltd:The) Sep. 3, 1993 –Abstract.

Chemical Abstracts, vol. 117, No. 20, Nov. 16, 1992, Abstract No. 195189, Kameoka Seiji et al. "Manufacture of Hydrogen–Absorbing Alloy Anodes"—Abstracts & JP–A–04 110 403 (Sanyo Electric Co) Apr. 10, 1992.

Chemical Abstracts, vol. 115, No. 14, Oct. 7, 1991, Abstract No. 139623, Kanekawa Ikuo et al. "Manufacture of Hydrogen–Absorbing Alloy Anode"—Abstract & JP–A–03 093 160 (Sanyo Electric Co.) Apr. 18, 1991.

Patent Abstracts of Japan, vol. 018, No. 586 (E–1627), Nov. 9, 1994 & JP–A–06 223827 (Sumitomo Metal Ind Ltd), Aug. 12, 1994 —Abstract.

Patent Abstracts of Japan, vol. 017, No. 668 (E–1473), Dec. 9, 1993 & Jp–A–05 225974 (Furukawa Battery Co Ltd:The) Sep. 3, 1993 —Abstract.

Patent Abstracts of Japan, vol. 013, No. 381 (E–810) Aug. 23, 1989 & JP–A–01 132048 (Matsushita Electric Ind Co Ltd), May 24, 1989 —Abstract.

Patent Abstracts of Japan, vol. 017, No. 144 (M–1386), Mar. 23, 1993 & JP–A–04 318106 (Furukawa Battery Co Ltd:The), Nov. 9, 1992 —Abstract.

*Primary Examiner*—John S. Maples
*Attorney, Agent, or Firm*—Evenson, McKeown, Edwards & Lenahan P.L.L.C.

[57] ABSTRACT

A hydrogen absorbing electrode using a hydrogen absorbing alloy including at least one or more kinds of transition metals belonging to VIIb-group, VIII-group or Ib-group in periodic table at a specified percentage, characterized in that a surface part of the hydrogen absorbing alloy forms a rich layer including the foregoing transition metals at a percentage larger than the foregoing specified percentage. Since the rich layer exists, an activation at initial stage of charge/discharge is not required. Accordingly, this electrode can be utilized effectively for a nickel-hydride secondary battery.

18 Claims, 16 Drawing Sheets

HYDROGEN ABSORBING ELECTRODE AND ITS MANUFACTURING METHOD

This is a continuation of application Ser. No. 08/545,709, filed Oct. 23, 1995, now abandoned.

TECHNICAL FIELD

This invention relates to a hydrogen absorbing electrode using a hydrogen absorbing alloy and its manufacturing method.

BACKGROUND ART

A nickel-hydride secondary battery using a hydrogen absorbing alloy, which can absorb and release hydrogen in a reversible manner, as an anode material has such features as low-pollution and high-energy density etc., so that it has been frequently used for power sources for portable equipment and electric motor etc., in place of a nickel-cadmium secondary battery and many studies and developments have been made thereon.

While, it is necessary to grind an alloy ingot into particles once and then to form them into a required shape, in order to make up an electrode by using the hydrogen absorbing alloy. For example, such methods are practiced industrially in general as (i) a method wherein alloy particles are added with binder to be formed into a paste and it is filled in a current collector and (ii) a method wherein it is formed into a sheet so as to be press bonded to the current collector, etc. In such electrode making-up process, a firm oxide film is apt to be produced on surfaces of the alloy particles. Since a hydrogen absorbing electrode on which surface the oxide film is produced offers an initial capacity fairly lower than an expected actual capacity, "activation" has been required at initial stage of charge/discharge. The activation means that the oxide film is destroyed to acquire an aimed discharge capacity by carrying out several cycles of charge/discharge at the initial stage of charge/discharge. In a battery using the hydrogen absorbing electrode having such a property, a discharge voltage and a battery capacity lower. Especially in a sealed-type battery, a capacity balance between anode and cathode is lost at the initial stage of charge/discharge, an inside pressure rise etc. occurs and a cycle life is reduced. In order to avoid the formation of oxide film, (i) a method for carrying out an electrode making-up process under an inert gas atmosphere and (ii) a method for putting an oxide film removal process in the electrode making-up process etc. are proposed. In these proposed methods, however, there have been such problems as a complex equipment and a troublesome work etc. In addition, even in the electrode prepared by the above proposed methods, there has been such a problem as the formation of oxide film depending on storage conditions after making-up.

Incidentally, in order to hasten the above activation, it is known that (1) the hydrogen absorbing alloy particles or hydrogen absorbing electrode is to be subjected to high-temperature alkaline treatment and (2) the hydrogen absorbing alloy particle is to be subjected to Ni-nonelectrolytic plating treatment. However, since insulating needle-like rare earth hydroxide is produced on the alloy surface in the treatment (1), it is necessary to carry out an ultra-sonic cleaning for removing the hydroxide. Further, a considerable rinsing work is required in order to remove alkali completely. Therefore, the treatment has been troublesome. The existence of needle-like rare earth hydroxide will cause a decrease in conductivity and a shortening of battery life. There are such problems in the treatment (2) that, (i) it is difficult to maintain constant plating conditions, (ii) handling is troublesome because an alloy after undergoing the treatment is inflammable, and (iii) the alloy is not continuous with a plated layer in term of grain structure so that, as the cycle goes on, the insulating needle-like rare earth hydroxide precipitates at a border part to cause a peeling-off of the plated layer.

In the nickel-hydride secondary battery, there were such problems as a rise of battery inside pressure at the last stage of charging to cause a breakage of container and scattering of electrolyte etc. The rise of battery inside pressure is said to be caused by hydrogen gas produced from an anode during charging. As a method for preventing such a rise of inside pressure, a method is known wherein Ni-plated layer is previously formed on the hydrogen absorbing alloy so as to enhance a hydrogen absorbing activity of the alloy. However, this method includes a problem of poor productivity due to a plating process which should be added to the electrode making-up process, besides the above problems similar to those of the above treatment (2).

DISCLOSURE OF THE INVENTION

An object of this invention is to provide a hydrogen absorbing electrode which does not require activation and a conductivity of which is not worsen even when it is used in alkaline electrolyte, and another object of it is to provide a method for manufacturing such a hydrogen absorbing electrode by a simple process only.

A hydrogen absorbing electrode of this invention, which uses a hydrogen absorbing alloy including at least one or more kinds of transition metals belonging to VIIb-group, VIII-group or Ib-group in periodic table at a specified percentage, is characterized in that a surface part of the hydrogen absorbing alloy forms a rich layer including the foregoing transition metals at a percentage larger than the foregoing specified percentage.

Since the rare earth element ready to form the oxide film is removed and the rich layer is formed in the hydrogen absorbing electrode having the above structure, the activation becomes unnecessary. Accordingly, the battery using the hydrogen electrode having the above structure has a high discharge voltage and battery capacity. Especially, in the sealed-type battery, the capacity balance between anode and cathode at the initial stage of charge/discharge is maintained and the inside pressure rise does not occur so that its service life is prolonged. In addition, electrode reaction is promoted with a good efficiency from the first cycle because the rich layer itself functions as a charge transfer reaction field. Since the rich layer is formed mainly by elusion of rare earth element, the needle-like rare earth hydroxide is not formed on the alloy surface so that the reduction of conductivity is controlled, even when the hydrogen absorbing electrode having the above structure is used as the anode in the alkaline electrolyte. Also from this point, the battery using the hydrogen absorbing electrode having the above structure becomes to have a high-capacity and a long service life.

The hydrogen absorbing alloy has Mm (misch metal), Al and transition metals as its components. Mm is a composite of rare earth elements. La, Ce, Pr and Nd etc. may be mentioned as the rare earth elements. Elements belonging to VIIb-group, VIII-group and Ib-group in periodic table may be mainly mentioned as the transition metals. For example, Ni, Co, Mn, Fe and Cu etc. may be mentioned as these metals.

In the hydrogen absorbing electrode having the above structure, the following structures may be used.

(1) The transition metals are mainly composed of Ni.

(2) A surface part of the rich layer consists of Ni layer. According to this structure, the hydrogen absorbing activity is made active so as to improve gas absorbing ability.

(3) A thickness of the rich layer ranges from 50 to 300 nm. When the thickness of the rich layer is smaller than 50 nm, the rich layer does not exert its function fully so that the activation becomes necessary. When the thickness of the rich layer is larger than 300 nm, the rich layer peels off so that the rich layer does not exert its function, and the rare earth hydroxide is produced on the hydrogen absorbing alloy surface so that the conductivity is worsened and the battery life is shortened.

A manufacturing method of hydrogen absorbing electrode of this invention, which uses a hydrogen absorbing alloy including at least one or more kinds of transition metals belonging to VIIb-group, VIII-group or Ib-group in periodic table, is characterized in that acid treatment process is provided wherein particles of the hydrogen absorbing alloy are dipped in aqueous solution of pH2 through pH6, and then rinsed and dried.

When the particles of hydrogen absorbing alloy are dipped in the aqueous solution of pH2 through pH6, the oxide film formed on the alloy surface is removed and Al and rare earth elements etc. are eluted from the alloy surface, so that the surface part of the alloy becomes a rich layer having a larger inclusion percentage of transition metal than original one. When the solution has an acidity stronger than pH2, even the Ni forming a major component of the alloy will be corroded to cause a decrease in mass of the alloy and a deterioration of the electrode property. Further, when the solution has an acidity stronger than pH2, a thickness of the rich layer becomes hard to be controlled and a thick rich layer is formed so that the rich layer will be peeled off as the cycle progresses. When the solution has an acidity weaker than pH6, the removal of oxide film and the elusion of Al and rare earth elements are hard to occur, so that the rich layer is hard to be formed. Since Al corrosive region is included in a range of pH2 to pH6, Al is ready to be eluded and the rich layer is apt to be formed. Since aqueous solution having an acidity of pH2 through pH6 is easily rinsed as compared with alkaline, the rinsing work is done within a short time so as to simplify the treatment.

In the manufacturing method having the above content, the following methods may be used.

(1) The aqueous solution is set to 20° C. through 90° C. According to this method, its reactivity is improved owing to such a high temperature, and the rich layer is apt to be formed so that the treatment time can be shortened.

Especially when the aqueous solution is set to 80° C. to 90° C., the Ni forming the component of hydrogen absorbing alloy eludes a little so that the eluded Ni precipitates on a surface part of the produced rich layer to become a Ni layer. Since this Ni layer can be obtained without undergoing a plating process, a productivity can be improved as compared with a conventional method in which the Ni layer is formed by the plating process. When the temperature is lower than 80° C., the Ni layer is not produced because the Ni is scarcely eluded.

(2) The aqueous solution is acetic acid/acetate buffer solution. According to this method, its pH is easily set to 2 through 6 and fluctuation of pH becomes small.

(3) The aqueous solution is an aqueous solution of organic acid. According to this method, the rare earth elements are selectively eluded so that the rich layer is apt to be produced. As the organic acid; formic acid, acetic acid, propionic acid, butyric acid, malonic acid, oxalic acid, acrylic acid, valeric acid, glycolic acid, citric acid, succinic acid, glutaric acid, lactic acid and tartaric acid etc. may be mentioned.

(4) In a front stage of the acid treatment process, a process is provided wherein a hydrogen absorbing alloy ingot is roughly ground to be classified and further finely ground to be classified, so that particles of the hydrogen absorbing alloy are prepared. According to this method, the alloy surface area is increased by grinding the alloy into fine particles, and the removal of oxide film and the elusion of Al and rare earth elements etc. are carried out with good efficiencies in the acid treatment process so that the rich layer is apt to be produced.

Especially when the hydrogen absorbing alloy particles prepared by finely grinding and classifying lie within a grain size range of 45 to 75 μm, the rich layer is apt to be produced more easily.

BEST MODE FOR CARRYING OUT THE INVENTION

EXAMPLE 1

A hydrogen absorbing alloy ingot having a composition of $MmNi_{3.8}Al_{0.3}Co_{0.7}Mn_{0.2}$ was made up and ground by machine to prepare alloy particles having appropriate sizes (grain size of 75 μm or smaller). Mm is a misch metal forming a composite comprising rare earth elements of one or more kinds of La, Ce, Pr and Nd.

Then, the alloy particles were dipped in acetic acid/sodium acetate buffer solution adjusted to 60° C. and pH3.6, stirred, rinsed and dried. In other words, the alloy particles were subjected to the acid treatment. Since the acetic acid/sodium acetate buffer solution was used, the pH was easily set and its fluctuation was small too.

The prepared alloy particles were added with a binder to be formed into a paste, filled in a nickel fiber substrate and dried, then it was pressed so that a hydrogen absorbing electrode was made up.

Figure 1:
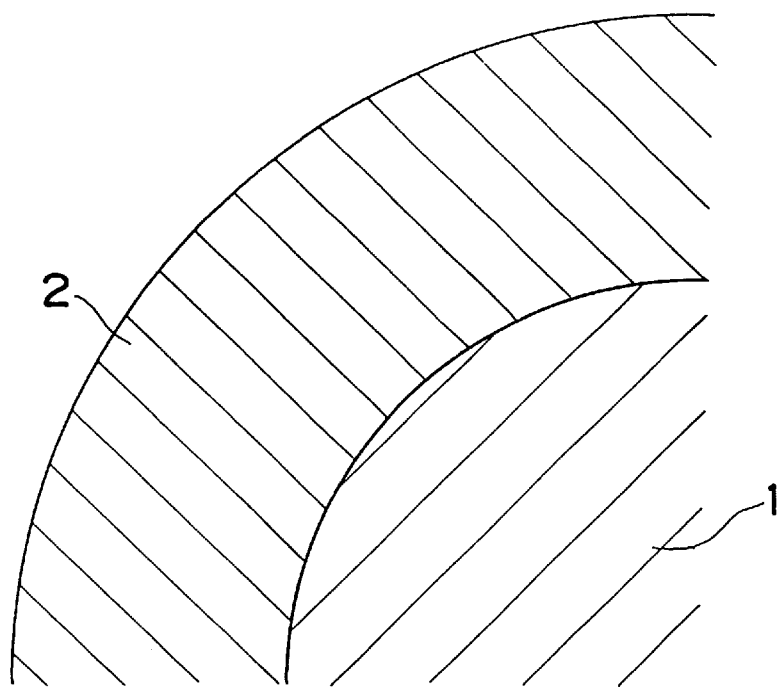
FIG. 1 is a partial sectional view of a hydrogen absorbing alloy after undergoing acid treatment of example 1.
Figure 2:
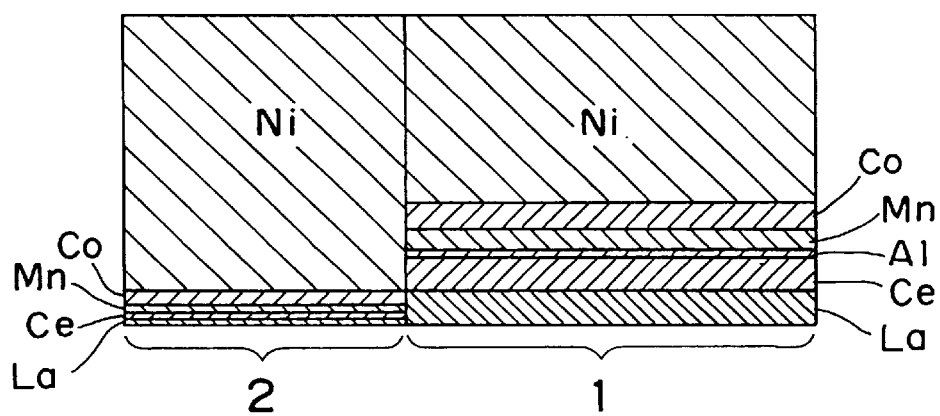
FIG. 2 is a view showing alloy composition ratio of a part corresponding to that of FIG. 1.

The alloy particles after undergoing the acid treatment were subjected to surface analysis by X-ray photoelectron spectroscopy (XPS), high-magnification surface observation by transmission-type electron microscope (TEM), element analysis and electron beam diffraction. It was found that the alloy particle had a sectional structure as shown in FIG. 1. Namely, a rich layer 2 was produced on an alloy particle surface by the acid treatment. 1 is a bulk. FIG. 2 shows an alloy composition ratio of a part corresponding to that of FIG. 1. The bulk 1 is a part having a composition of $MmNi_{3.8}Al_{0.3}Co_{0.7}Mn_{0.2}$ which is an original composition. The rich layer 2 had a thickness of 50 to 300 nm. The thickness of rich layer 2 is controlled by a dipping time of the acid treatment. As obvious from FIG. 2, the rich layer 2 has a larger inclusion percentage of transition metals such as Ni, Co and Mn etc. as compared with the bulk 1, mainly because of elusion of Al and the rare earth elements in Mm.

Figure 3:
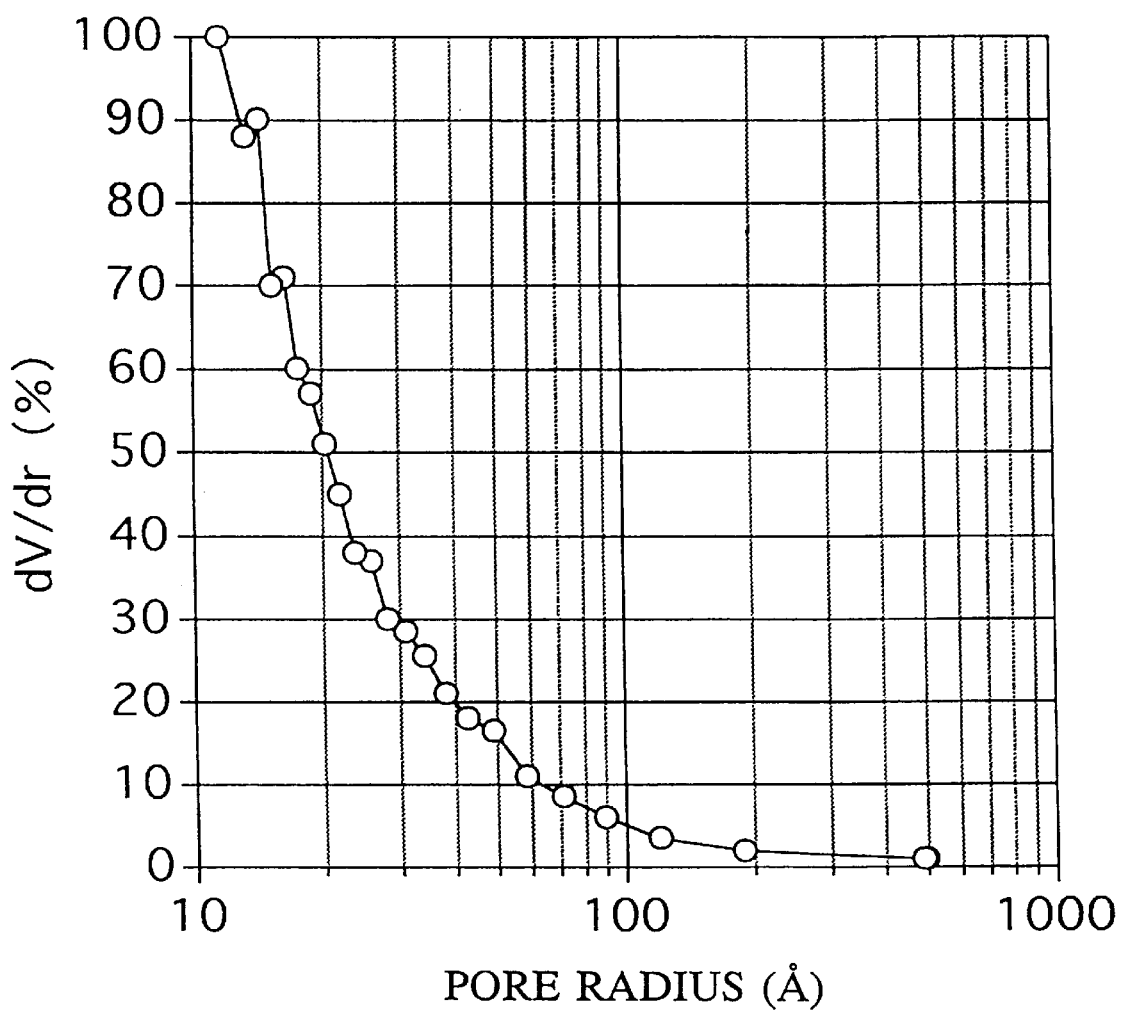
FIG. 3 is a view showing a pore diameter distribution of a hydrogen absorbing alloy after undergoing acid treatment of example 1.

Pore diameter distribution was measured on the alloy particles after undergoing acid treatment. FIG. 3 shows measured results of pore diameter distribution measured from an absorption side. As obvious from FIG. 3, the surface of alloy particle had a structure mainly including fine pores having diameters of several tens of angstroms. The surface area was calculated as about 400 $m^2/g$ from specific surface area measurement results, and this value was fairly large. The alloy particles visually presented black color due to irregular reflection.

Comparison Example 1

A hydrogen absorbing electrode was made up in the same way as that of example 1 except that the acid treatment was not done.

Comparison Example 2

A hydrogen absorbing electrode was made up in the same way as that of example 1 except that alkali treatment using alkali aqueous solution was done in place of the acid treatment.

Comparison Example 3

The dipping time in the acid treatment of example 1 was prolonged to form a rich layer thicker than 300 μm. Other conditions were made identical with those of example 1.

Test 1

Figure 4:
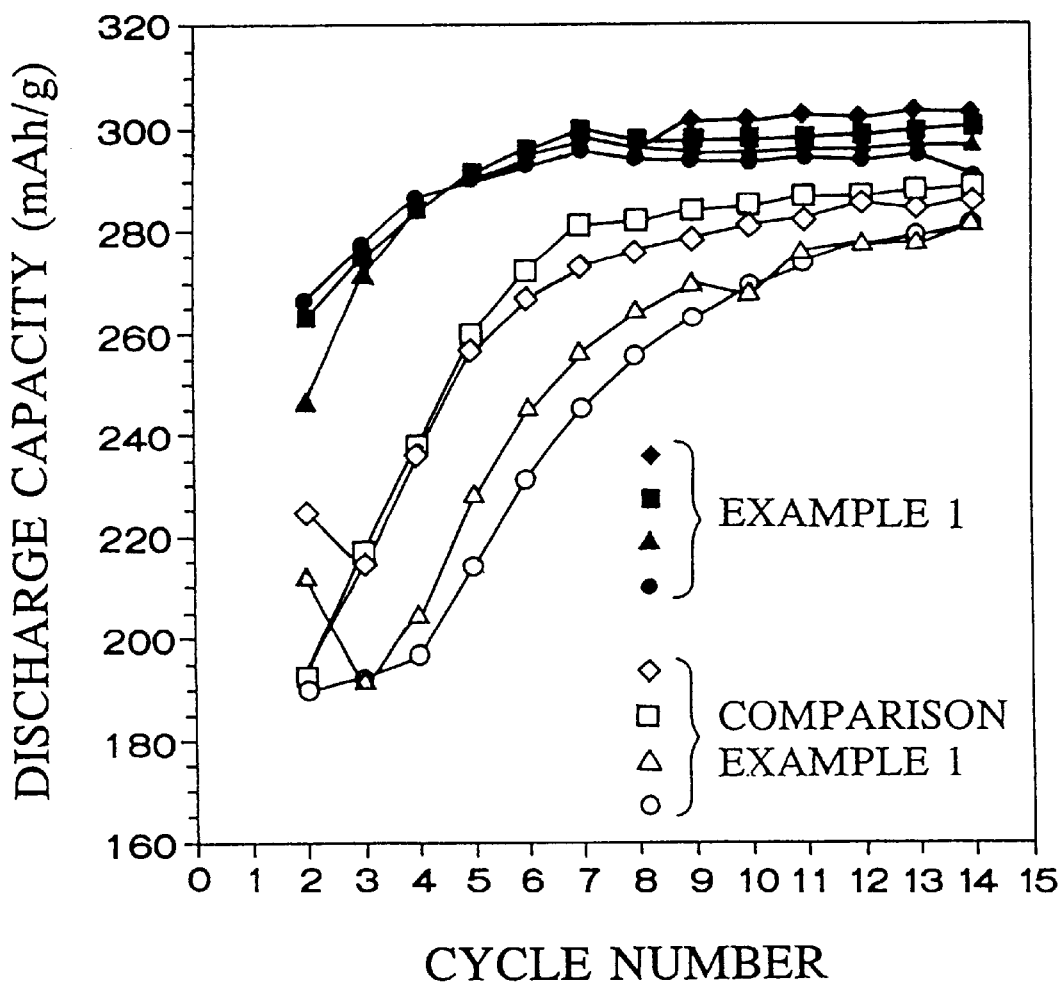
FIG. 4 is a view showing cycle test results on a battery using a hydrogen absorbing electrode of example 1 and a battery using a hydrogen absorbing electrode of comparison example 1.

(1) Using the hydrogen absorbing electrode of example 1 and using an ordinary nickel electrode as a counter electrode, four cells of open-type nickel-hydride secondary batteries were made up. Using the hydrogen absorbing electrode of comparison example 1, four cells of batteries were made up in the same way. Cycle tests were done under conditions of charge of 0.1C×150% and discharge of 0.2C (cut potential −600 mV vs. Hg/HgO). FIG. 4 shows the results. As obvious from FIG. 4, activation velocities and discharge capacities scatter in the electrodes of comparison example 1, but in the electrodes of example 1, the activation velocities are approximately same and large at that, and the discharge capacities are large too.

Figure 5:
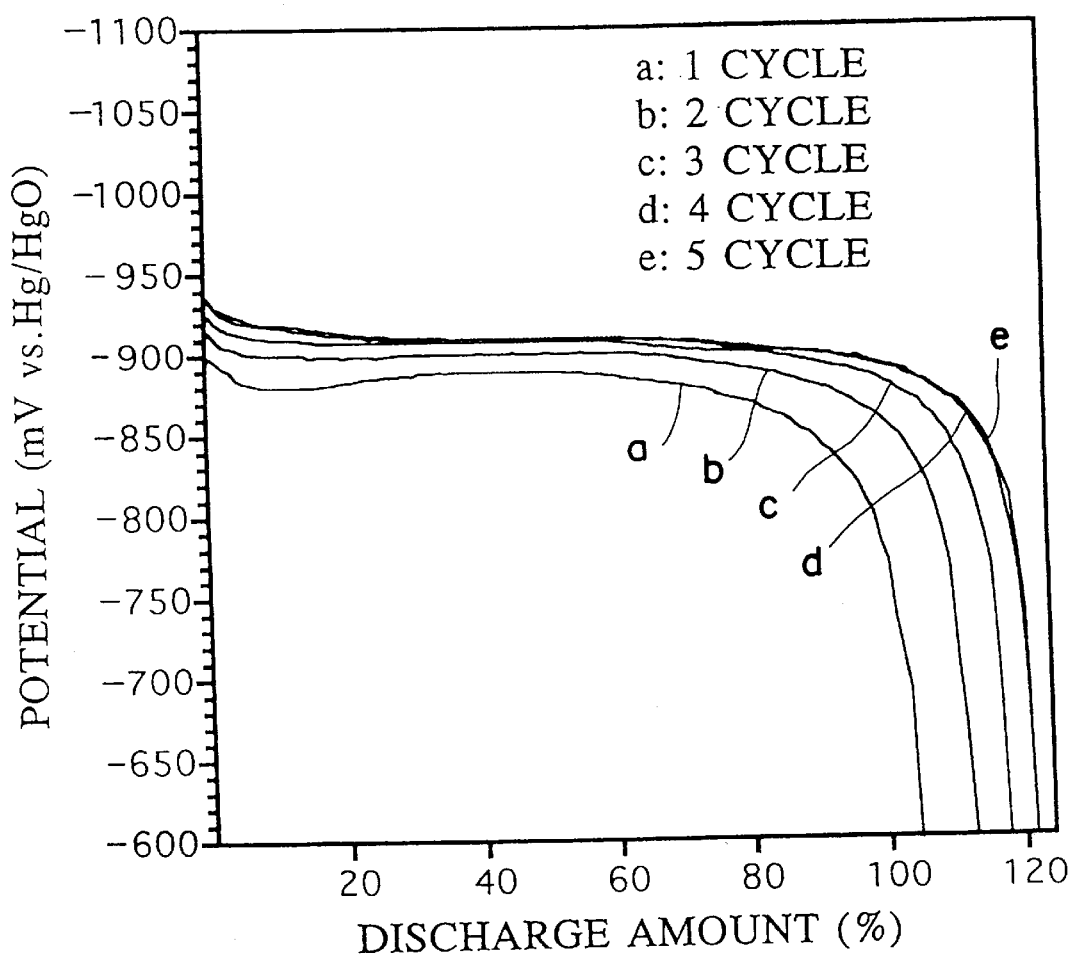
FIG. 5 is a view showing a discharge curve of the hydrogen absorbing electrode of example 1.
Figure 6:
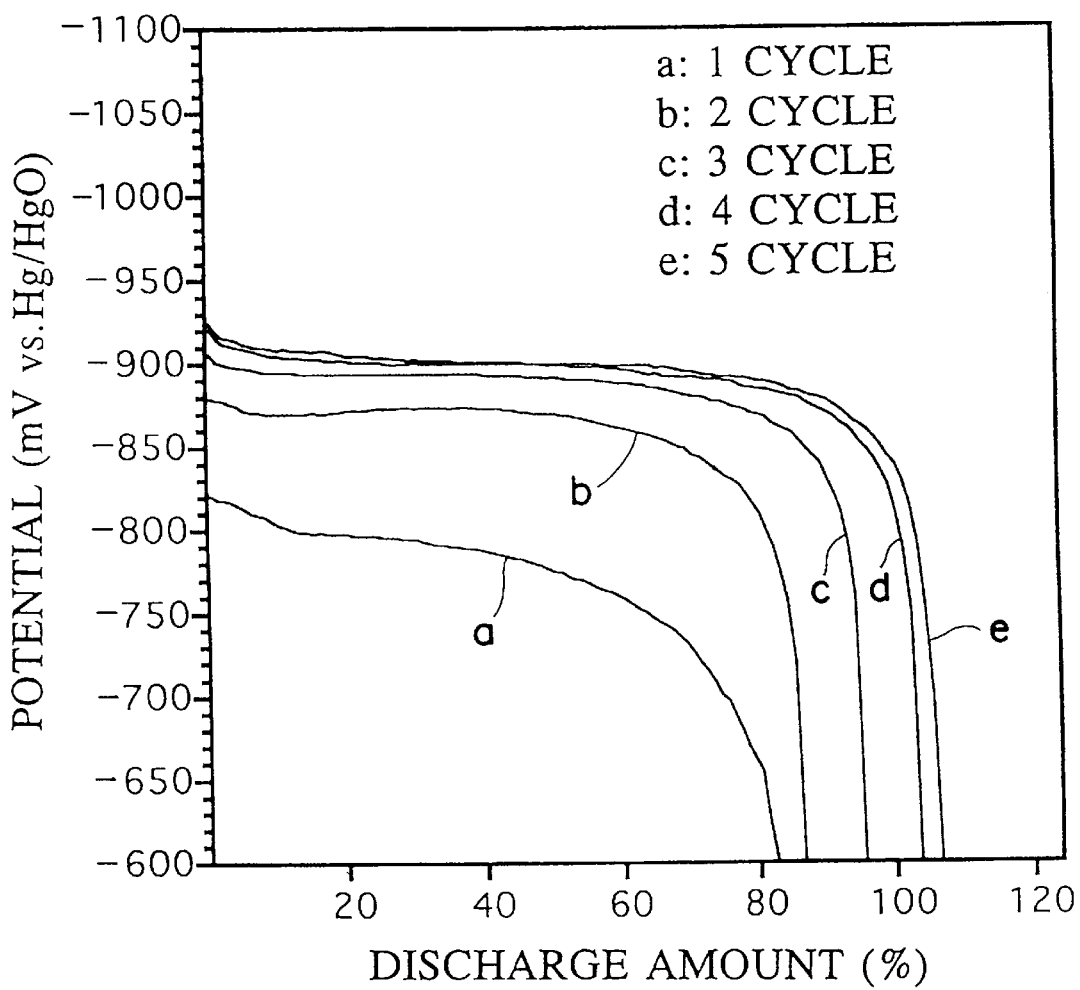
FIG. 6 is a view showing a discharge curve of the hydrogen absorbing electrode of comparison example 1.

(2) Concerning the electrode of example 1 and the electrode of comparison example 1, discharge curves of first through fifth cycles were plotted. FIG. 5 shows discharge curves of the electrode of example 1, and FIG. 6 shows discharge curves of the electrode of comparison example 1. As seen from the both figures, a discharge potential stands noble from the first cycle and becomes higher as the cycle goes on in the electrode of comparison example 1, but the discharge potential stands more basic from the first time in the electrode of example 1.

Figure 7:
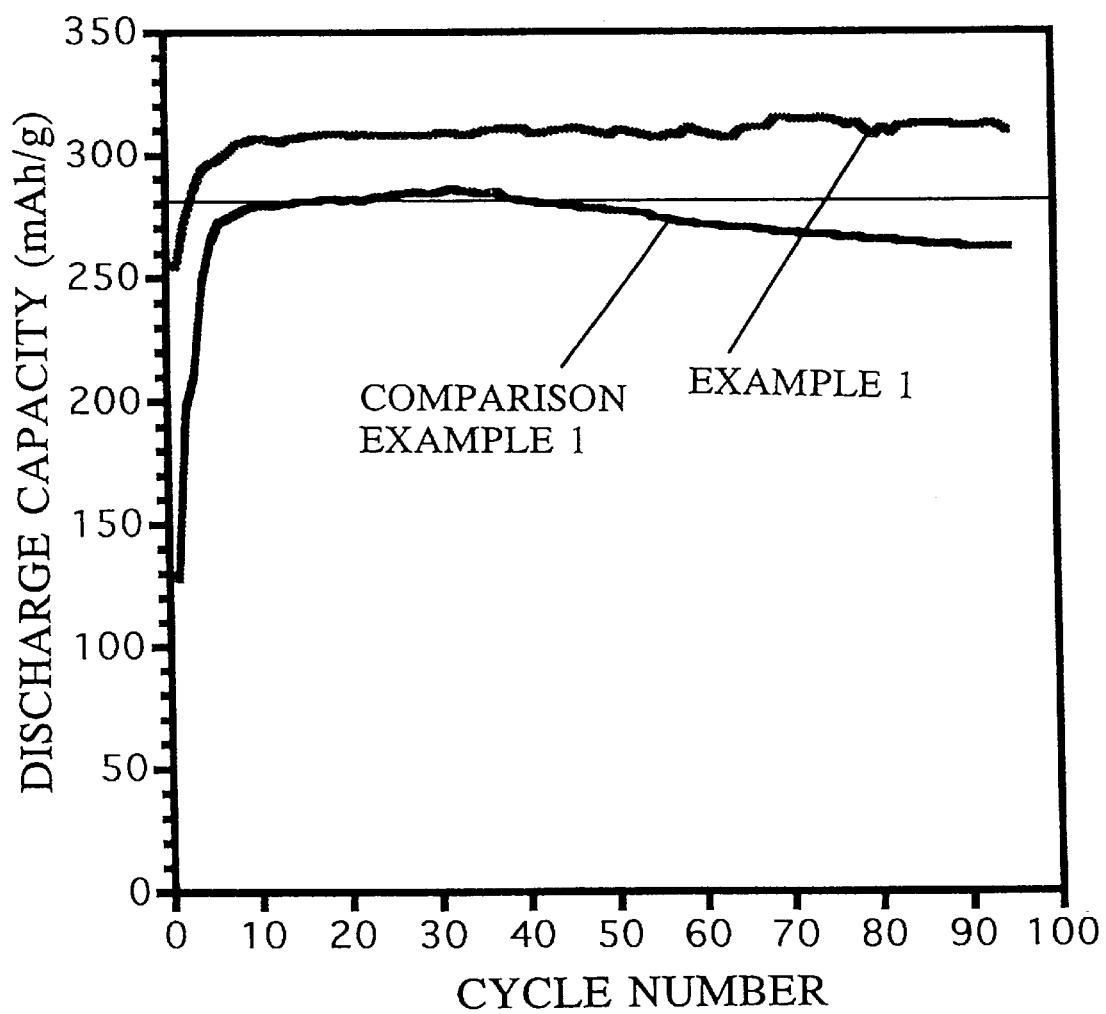
FIG. 7 is a view showing cycle test results on the hydrogen absorbing electrode of example 1 and the hydrogen absorbing electrode of comparison example 1.

(3) Cycle tests were done on the electrode of example 1 and the electrode of comparison example 1. FIG. 7 shows the results. As obvious from FIG. 7, the electrode of example 1 is more excellent in cycle characteristics than the electrode of comparison example 1.

Figure 8:
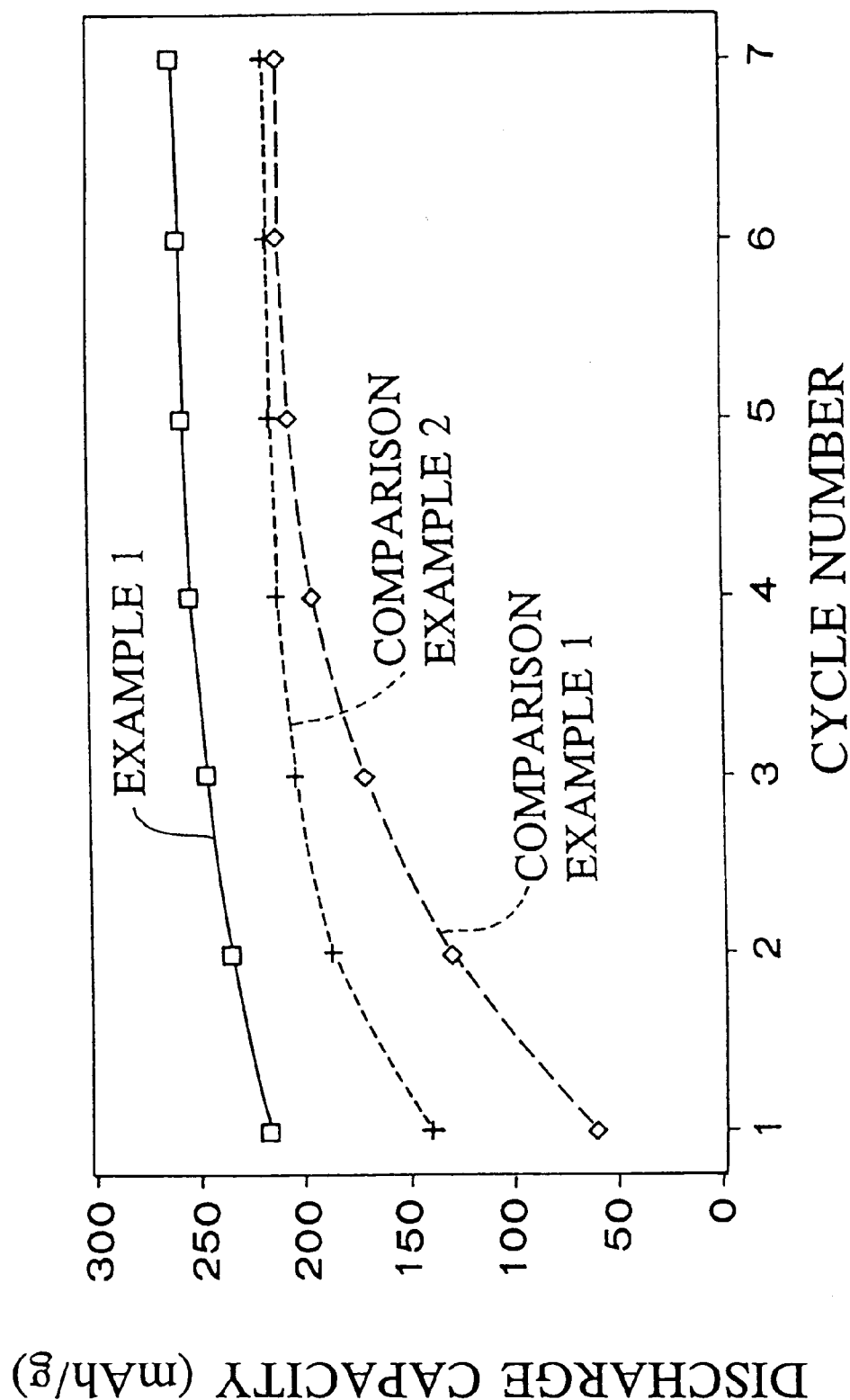
FIG. 8 is a view showing changes of initial discharge capacities on the hydrogen absorbing electrode of example 1, the hydrogen absorbing electrode of comparison example 1 and a hydrogen absorbing electrode of comparison example 2.

(4) Changes of initial discharge capacities were measured on the electrode of example 1, the electrode of comparison example 1 and the electrode of comparison example 2. FIG. 8 shows the results. As obvious from FIG. 8, an initial activation of the electrode of comparison example 2 is quicker than that of the electrode of comparison example 1. In addition, an initial activation of the electrode of example 1 is further quicker than that and its capacity is large too.

Figure 9:
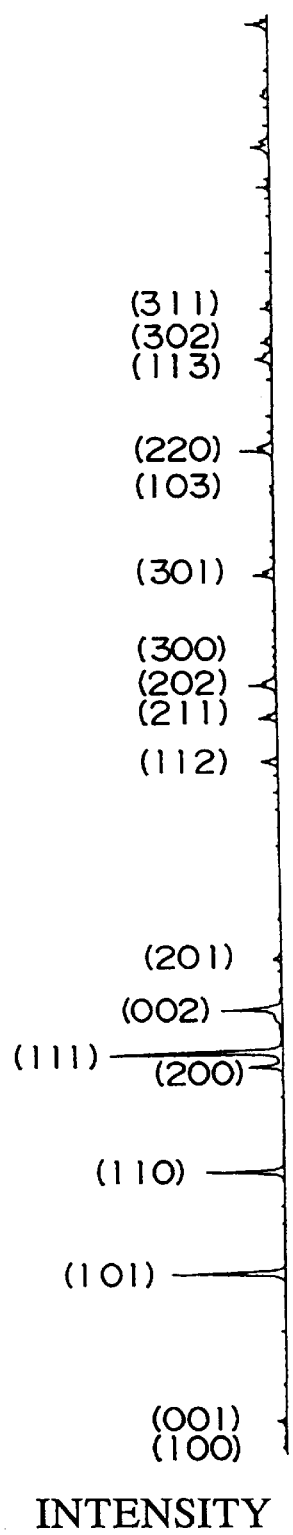
FIG. 9 is a view showing X-ray diffraction peaks before charge/discharge of a hydrogen absorbing electrode of comparison example 3.
Figure 10:
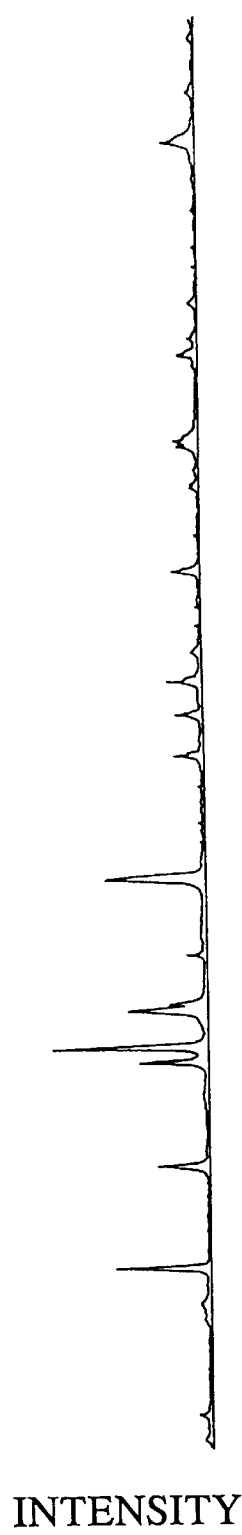
FIG. 10 is a view showing X-ray diffraction peaks after charge/discharge of the hydrogen absorbing electrode of example 1.
Figure 11:
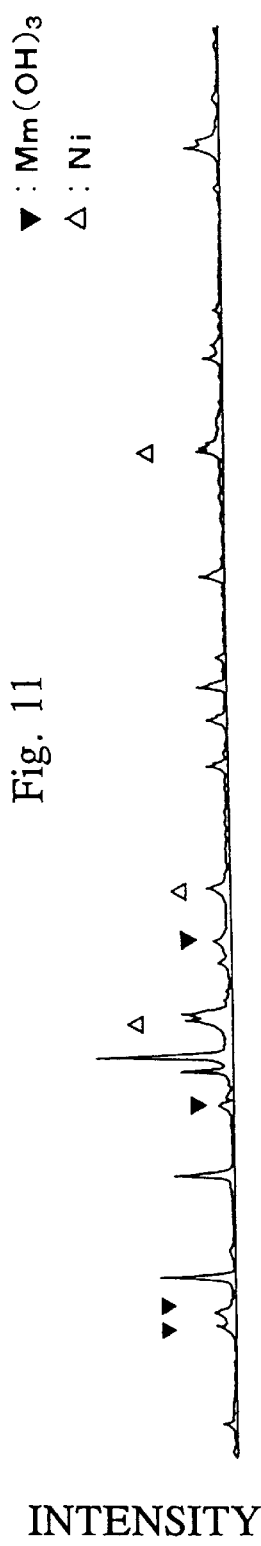
FIG. 11 is a view showing X-ray diffraction peaks after charge/discharge of the hydrogen absorbing electrode of comparison example 3.
Figure 12:
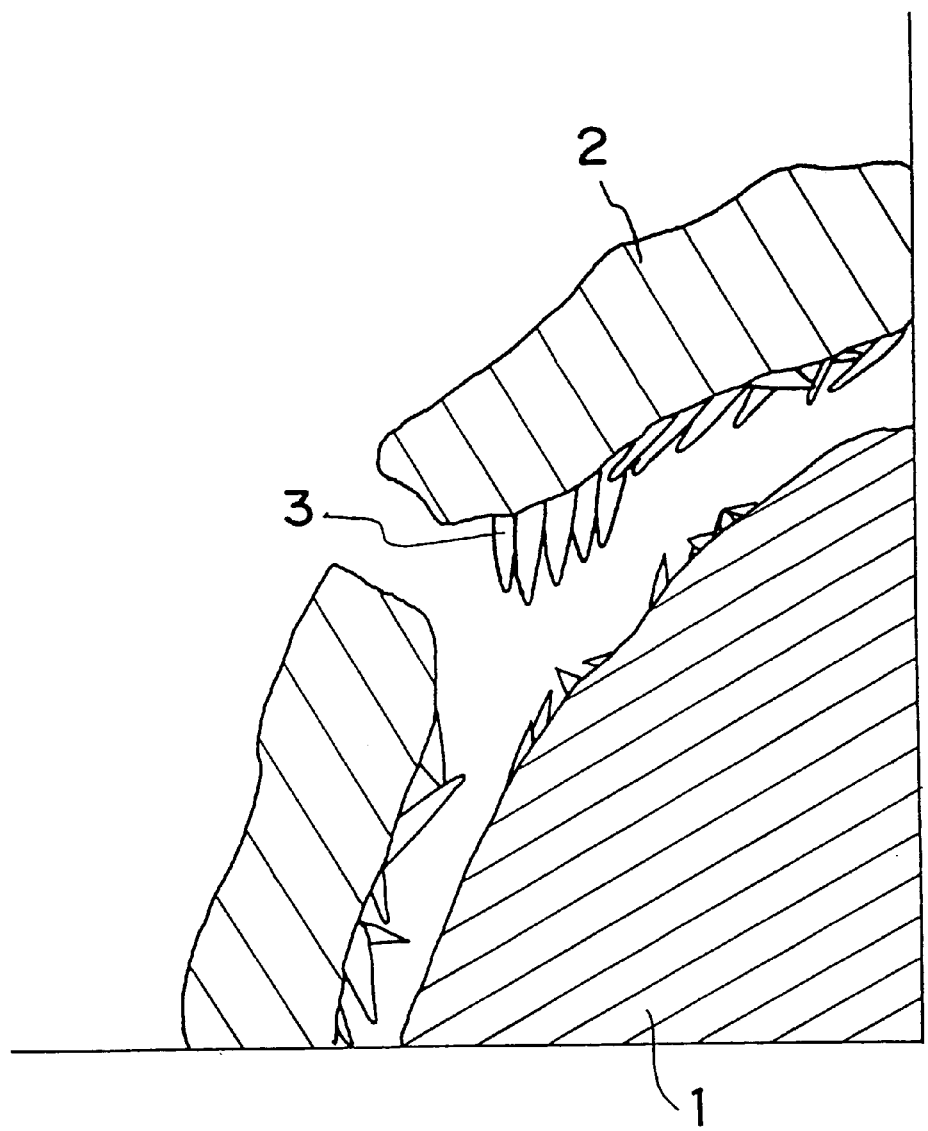
FIG. 12 is a partial sectional view of an alloy for the hydrogen absorbing electrode of comparison example 3 after charge/discharge.

(5) X-ray diffractions were measured on the electrode of example 1 and the electrode of comparison example 3. FIG. 9 shows X-ray diffraction peaks of the electrode of comparison example 3 before charge/discharge, FIG. 10 shows X-ray diffraction peaks of the electrode of example 1 after charge/discharge, and FIG. 11 shows X-ray diffraction peaks of the electrode of comparison example 3 after charge/discharge. In FIG. 11, $Mm(OH)_3$ is rare earth hydroxide. As obvious from FIG. 11, the peaks of rare earth hydroxide were confirmed after charge/discharge in the electrode of comparison example 3. When the electrode alloy surface of comparison example 3 after undergoing charge/discharge was observed by electron microscope, the rich layer 2 peeled off from the bulk 1 and a rare earth hydroxide 3 existed between the rich layer 2 and the bulk 1 as shown in FIG. 12. In other words, when the rich layer 2 is thicker than 300 nm, the rich layer 2 peels off and the rare earth hydroxide 3 is produced. When the rich layer 2 peels off, the rich layer 2 does not exert its function. When the rare earth hydroxide 3 is produced, the conductivity is worsened and the battery service life is shortened. When the rich layer 2 is thinner than 50 nm, the rich layer 2 does not exert its function.

EXAMPLE 2

A hydrogen absorbing electrode was made up in the same way as the example 1 except that the pH values in the acid treatment of example 1 were set to six kinds. The pH values were set to 2.09, 2.71, 3.59, 4.00, 4.71 and 5.96.

Figure 13:
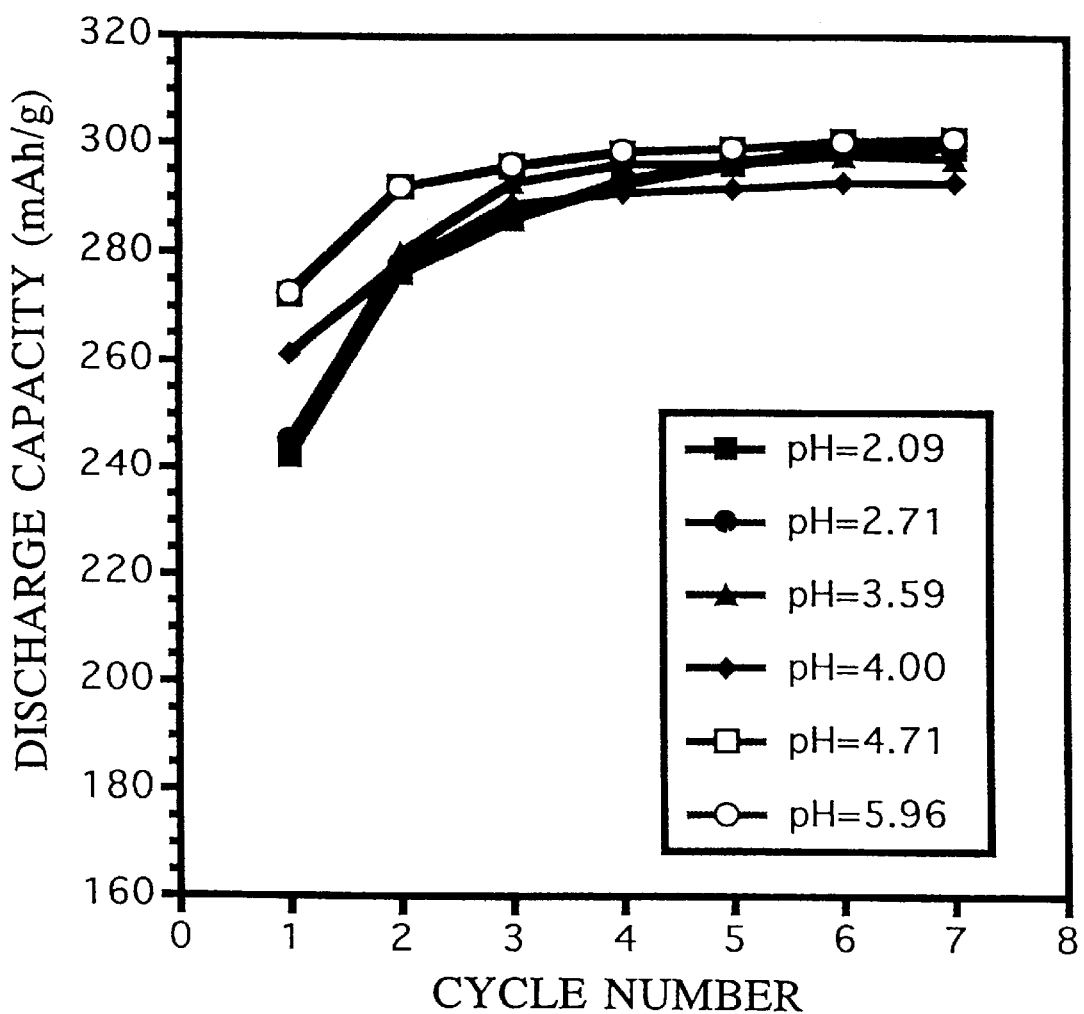
FIG. 13 is a view showing cycle test results on the hydrogen absorbing electrode of example 2.

The prepared hydrogen absorbing electrodes were subjected to cycle tests, and the all electrodes presented initial characteristics same with those of the example 1 as illustrated in FIG. 13. From this fact, it can be understood that the rich layer 2 similar to that of example 1 is produced provided that the pH value lies within a range from 2 to 6.

EXAMPLE 3

A hydrogen absorbing electrode was made up in the same way as the example 1 except that temperatures in the acid treatment of example 1 were set to four kinds. The temperatures were set to 20° C., 40° C., 60° C., and 80° C. through 90° C.

Figure 14:
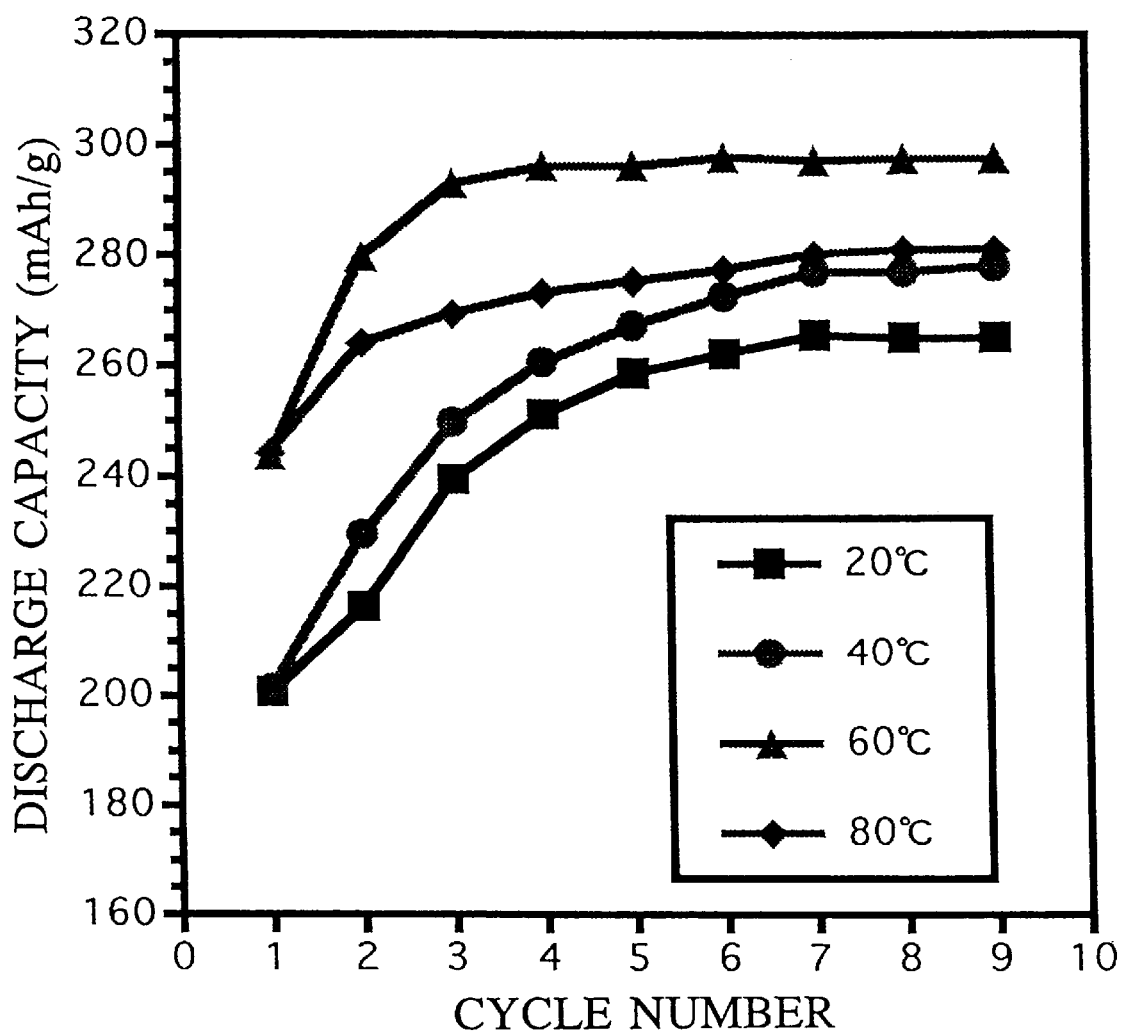
FIG. 14 is a view showing cycle test results on a hydrogen absorbing electrode of example 3.

The prepared hydrogen absorbing electrodes were subjected to cycle tests, and the higher the temperature rose the larger the initial discharge capacity became as illustrated in FIG. 14. Even in case of 20° C. developing the lowest initial capacity, the initial capacity was higher than capacities of the electrodes of comparison example 1 and comparison example 2 shown in FIG. 8 so that it was very satisfactory. Namely, it can be understood that the rich layer 2 similar to that of example 1 is produced provided that the temperature lies within a range from 20° C. to 90° C.

Figure 15:
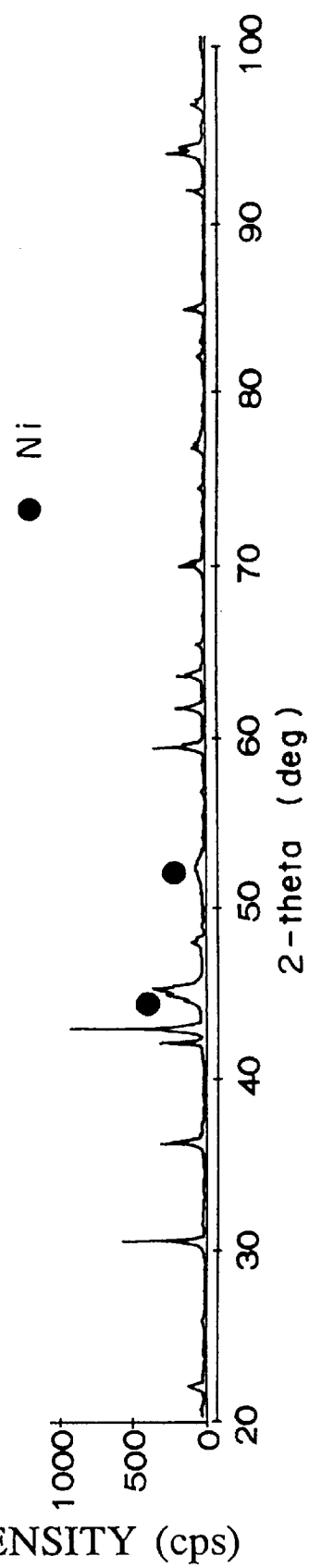
FIG. 15 is a view showing X-ray diffraction peaks of the hydrogen absorbing alloy obtained when setting a temperature of acid treatment to 80° C. to 90° C. in the example 3.
Figure 16:
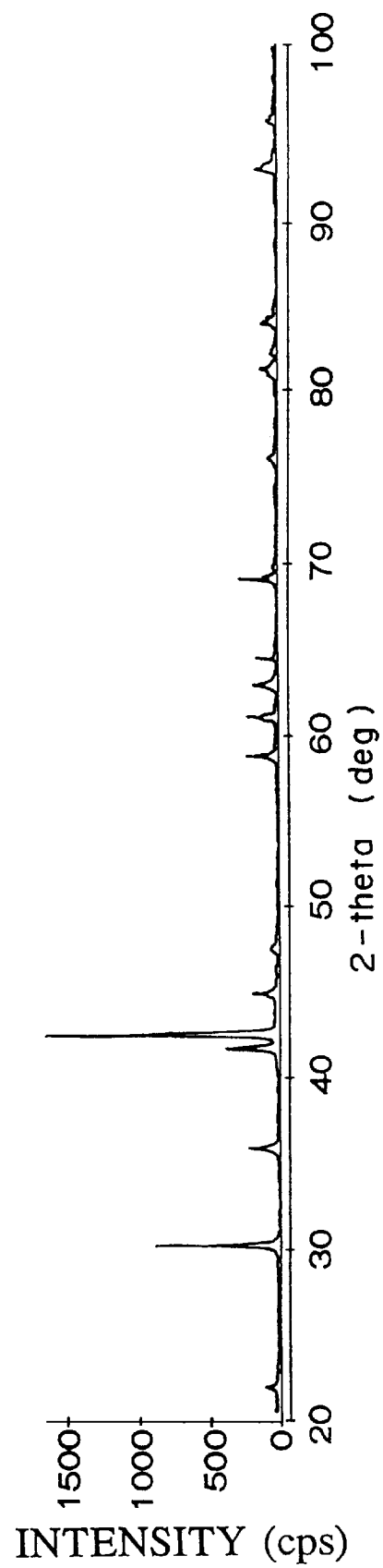
FIG. 16 is a view showing X-ray diffraction peaks of the hydrogen absorbing alloy of comparison example 1.
Figure 17:
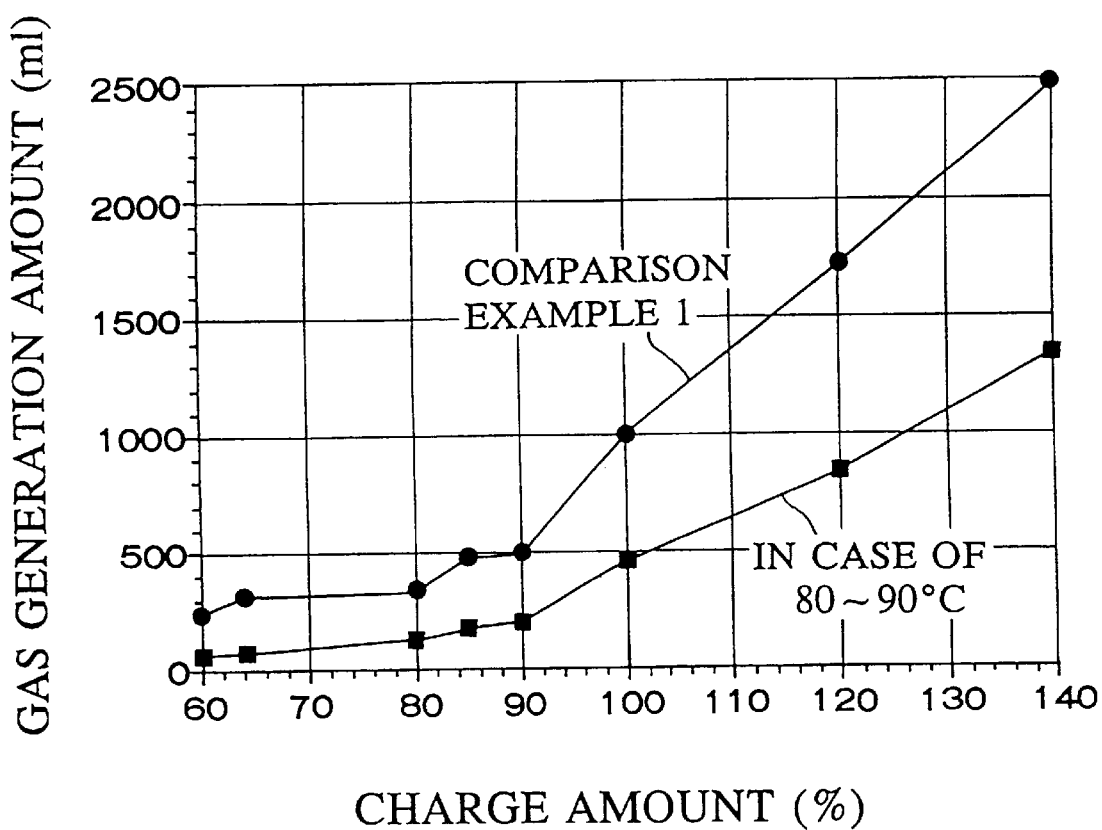
FIG. 17 is a view showing measured results of gas generation amount at the end of initial charge on the hydrogen absorbing electrode obtained when setting the temperature of acid treatment temperature to 80° C. to 90° C. in the example 3 and on the hydrogen absorbing electrode of comparison example 1.

X-ray diffractions were measured on the hydrogen absorbing alloy after undergoing acid treatment at 80° C. through 90° C. and the hydrogen absorbing alloy of comparison example 1. FIG. 15 shows X-ray diffraction peaks of the alloy after undergoing the acid treatment at 80° C. through 90° C., and FIG. 16 shows X-ray diffraction peaks of the alloy of comparison example 1. As obvious from FIG. 15, Ni-peak is seen in the alloy after undergoing the acid treatment at 80° C. through 90° C. Namely, the rich layer is produced on the alloy surface, and Ni layer is further produced on a surface of the rich layer. FIG. 17 shows gas generation amounts at the end of initial discharge on the hydrogen absorbing electrode in case of 80° C. through 90° C. and the hydrogen absorbing electrode of comparison example 1. As obvious from FIG. 17, a battery using the electrode in case of 80° C. through 90° C. is reduced in a rise of inside pressure as compared with the electrode of comparison example 1. As described above, according to the hydrogen absorbing electrode prepared by setting the temperature condition of acid treatment to 80° C. through 90° C., the activation becomes unnecessary because the rich layer is produced, and the gas absorbing ability is improved because the Ni layer is produced on the surface of rich layer.

EXAMPLE 4

Alloy particles prepared in the same way as the example 1 were dipped in acetic acid aqueous solution adjusted to 60° C. and pH 2.7, stirred and rinsed and then dried. In other words, the alloy particles were subjected to acid treatment.

The prepared alloy particles were added with a binder to be formed into a paste, filled in a nickel-fiber substrate, dried and pressed so that a hydrogen absorbing electrode was made up.

Test 2

Figure 18:
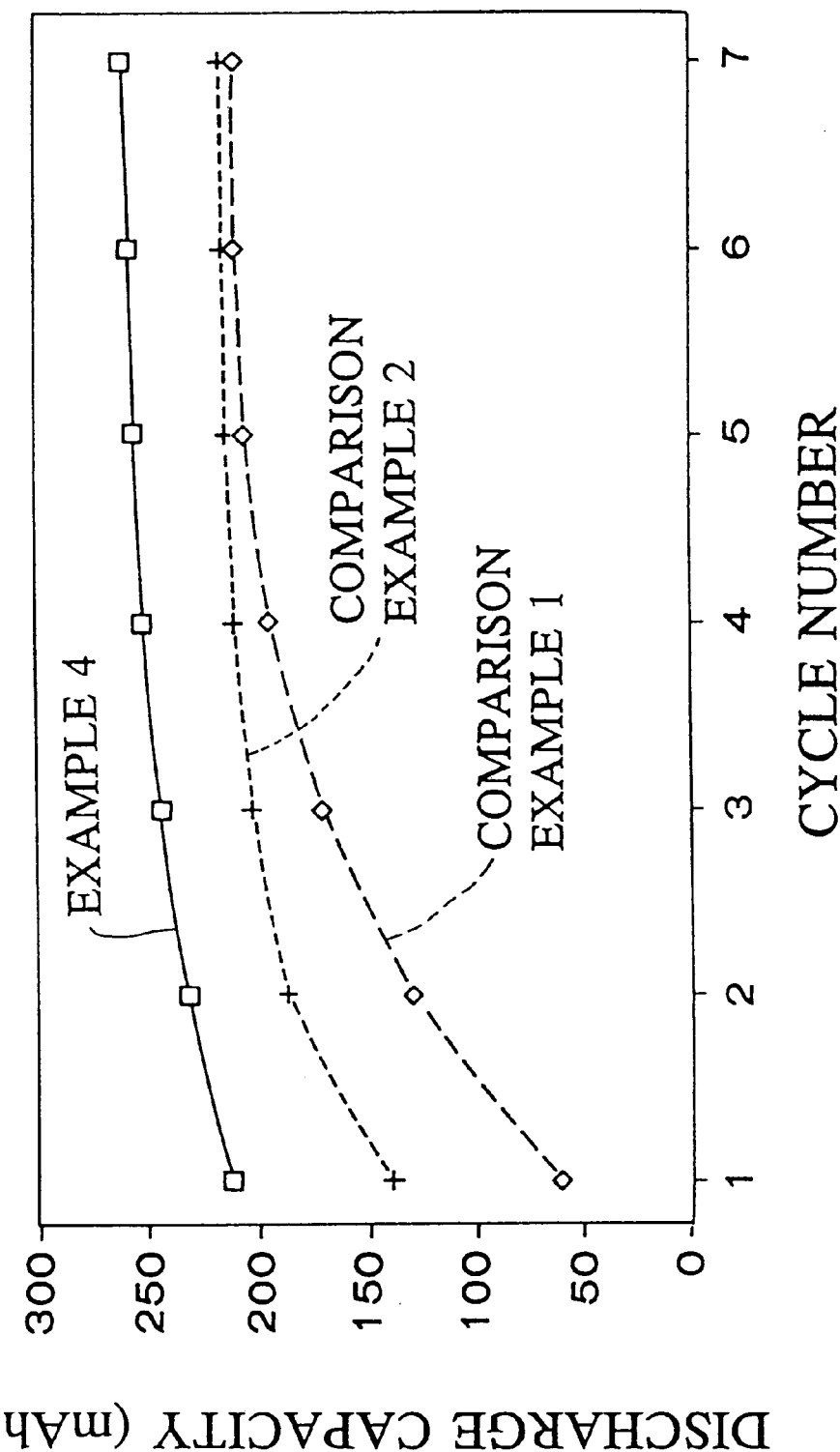
FIG. 18 is a view showing changes of initial discharge capacities on a hydrogen absorbing electrode of example 4, the hydrogen absorbing electrode of comparison example 1 and the hydrogen absorbing electrode of comparison example 2.

Changes of initial discharge capacities were measured on the electrode of example 4, the electrode of comparison example 1 and the electrode of comparison example 2. FIG. 18 shows these results. As seen from FIG. 18, an initial activation of the electrode of comparison example 2 is quicker than that of the electrode of comparison example 1. However, an initial activation of the electrode of example 4 is further quicker and its capacity is large too.

A rich layer similar to that of example 4 will be produced even when using other organic acids such as formic acid, acetic acid, propionic acid, butyric acid, malonic acid, oxalic acid, acrylic acid, valeric acid, glycolic acid, citric acid, succinic acid, glutaric acid, lactic acid and tartaric acid etc., in place of the acetic acid.

EXAMPLE 5

A hydrogen absorbing electrode was made up in the same way as the example 1 except that a hydrogen absorbing alloy having a composition of $MmNi_{3.8}Al_{0.5}Co_{0.7}$ was used.

Comparison Example 4

A hydrogen absorbing electrode was made up in the same way as the example 5 except that the acid treatment was not done.

Test 3

Figure 19:
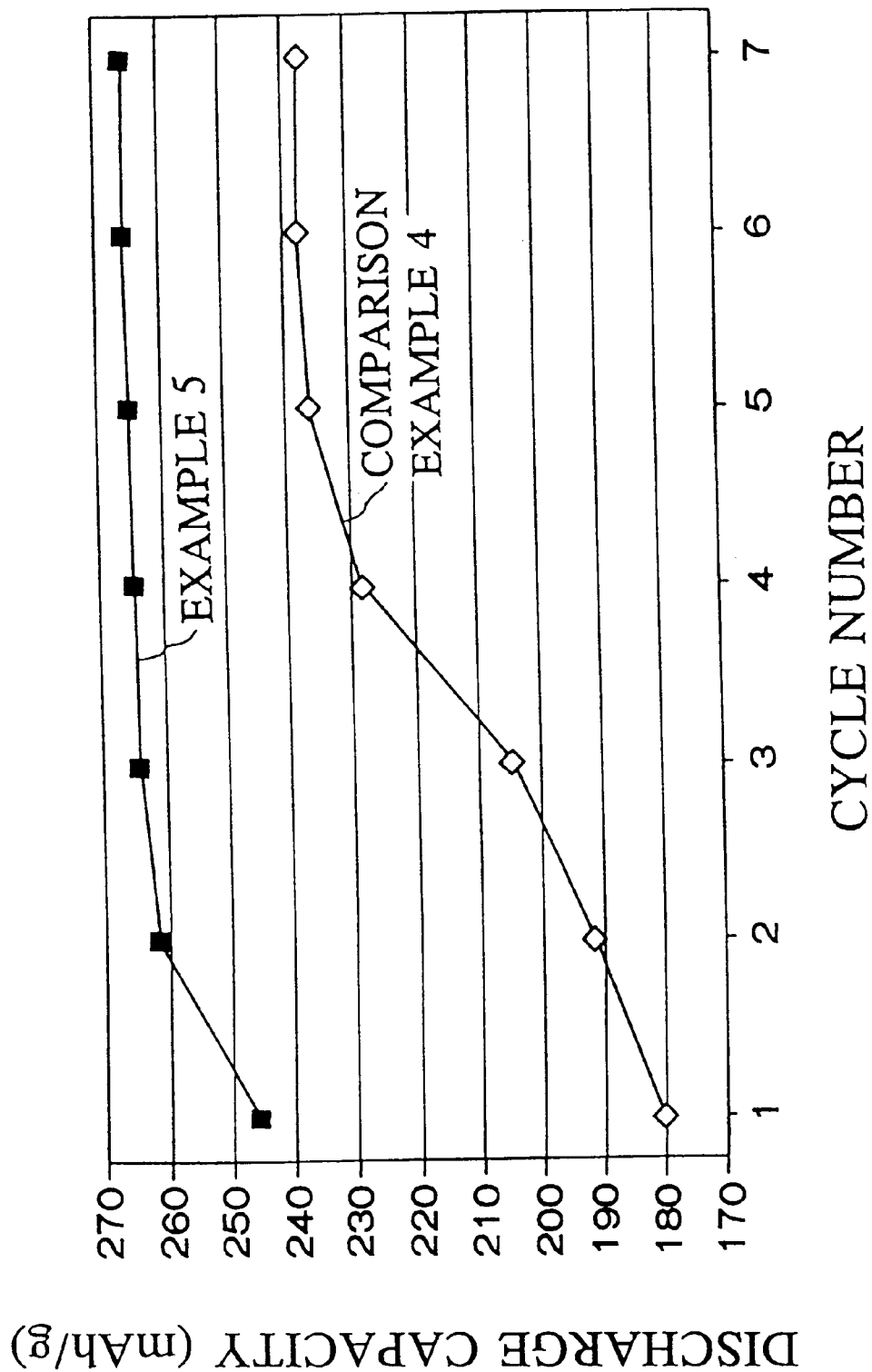
FIG. 19 is a view showing cycle test results on a hydrogen absorbing electrode of example 5 and a hydrogen absorbing electrode of comparison example 4.

Cycle tests were done on the electrode of example 5 and the electrode of comparison example 4. FIG. 19 shows these results. As obvious from FIG. 19, the electrode of example 5 presents an excellent cycle characteristic as compared with the electrode of comparison example 4.

EXAMPLE 6

A hydrogen absorbing alloy having the composition of $MmNi_{3.8}Al_{0.3}Co_{0.7}Mn_{0.2}$ was weighed, thrown in a crucible, and then molten by a high-frequency melting furnace under an atmosphere of inert gas, so as to make up a hydrogen absorbing alloy ingot. This alloy ingot was rough ground mechanically to classify only particles within a grain size range of 75 to 150 µm by using a screen. The classified particles were further rough ground mechanically to classify only particles within a grain size range of 45 to 75 µm by using a screen, so that alloy particles were prepared.

In the next place, the alloy particles were dipped in acetic acid/sodium acetate buffer solution adjusted to 60° C. and pH 3.6, stirred and rinsed and then dried. In other words, the alloy particles were subjected to acid treatment.

The prepared alloy particles were added with binder to be formed into a paste, filled in a nickel-fiber substrate, dried and pressed so that a hydrogen absorbing electrode was made up.

The alloy particles after undergoing the acid treatment were subjected to surface analysis by X-ray photoelectron spectroscopy (XPS), high-magnification surface observation by transmission-type electron microscope (TEM), element analysis and electron beam diffraction. It was found that the alloy particles had a sectional structure similar to the alloy particles of example 1. Namely, a rich layer 2 having a larger inclusion percentage of transition metal such as Ni, Co & Mn etc. than that of the bulk 1, was produced on a surface of the bulk 1.

Comparison Example 5

A hydrogen absorbing electrode was made up in the same way as the example 6 except that the acid treatment was not done.

Test 4

Figure 20:
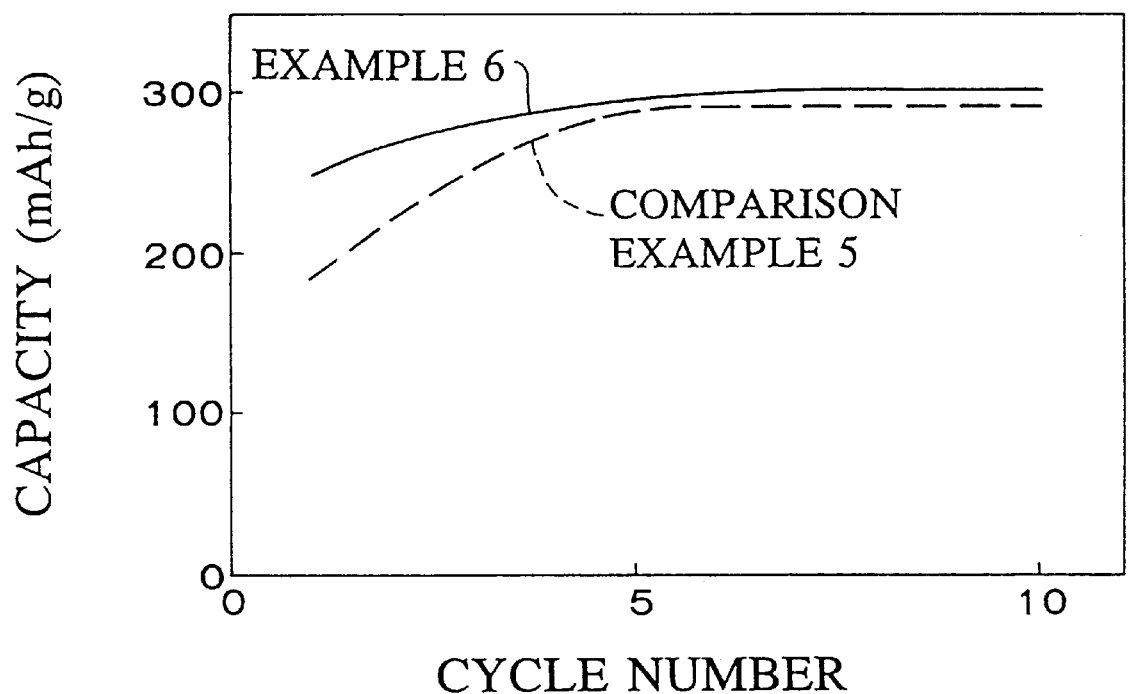
FIG. 20 is a view showing cycle test results on a battery using a hydrogen absorbing electrode of example 6 and a battery using a hydrogen absorbing electrode of comparison example 5.

Using the hydrogen absorbing electrode of example 6 and using a well-known sintered-type nickel-hydroxide electrode as a counter-electrode, potassium-hydroxide aqueous solution having a specific weight of 1.28 was filled excessively therein as a electrolyte and left as it was for a specified time, so that an open-type nickel-hydride secondary battery including an excessive cathode capacity was made up. Using the hydrogen absorbing electrode of comparison example 5, a battery was made up in the same way. Cycle tests were done on the both batteries. Test conditions were such that 150% of expected hydrogen absorbing electrode capacity were charged at a temperature of 20° C. and with a current of 0.1 C of battery capacity, and discharge was done until the hydrogen absorbing electrode got to −0.6V on the basis of mercury oxide reference electrode at a current of 0.2 C. FIG. 20 shows the results. As obvious from FIG. 20, an activation of the electrode of example 6 is quicker than that of the electrode of comparison example 5. In addition, the battery using the electrode of example 6 attained a capacity so large as 300 mAh/g but the battery using the electrode of comparison example 5 attained a capacity as small as 290 mAh/g. Namely, the battery using the electrode of example 6 included a high capacity.

Activations of both the electrode of example 6 and the electrode of comparison example 5 were done comparatively quickly until the high capacities were attained. The reason is supposed to be that alloy surface area increases owing to finely ground particles to ease effective removal of oxide film and elution of Al and rare earth elements etc. in the acid treatment process, so that the rich-layer is apt to be produced. Especially, when the hydrogen absorbing alloy particles prepared by being ground and classified lie within a grain size range of 45 to 75 μm, it can be considered that the rich-layer is further apt to be produced.

Industrial Applicability

According to this invention, characteristics of a hydrogen absorbing electrode can be improved and the hydrogen absorbing electrode can be manufactured easily. Therefore, this invention can be utilized effectively for a nickel-hydride secondary battery.

What is claimed is:

1. A hydrogen absorbing electrode comprising a hydrogen absorbing alloy which comprises Mm and Al and a predetermined percentage of at least one transition metal selected from the group consisting of VIIb-group, VIII-group and Ib-group in the periodic table, wherein Mm is a composite of rare earth elements, wherein a surface portion of the hydrogen absorbing alloy forms a layer which is rich in the at least one transition metal at a percentage larger than the predetermined percentage and which does not peel off.

2. A hydrogen absorbing electrode as set forth in claim 1, wherein the transition metal is primarily Ni.

3. A hydrogen absorbing electrode as set forth in claim 1, wherein a surface portion of the rich layer consists of a Ni layer.

4. A hydrogen absorbing electrode as set forth in claim 1, wherein the rich layer has a thickness in the range of 50 to 300 nm.

5. A method of manufacturing a hydrogen absorbing electrode comprising a hydrogen absorbing alloy which comprises Mm and Al and a predetermined percentage of at least one transition metal selected from the group consisting of VIIb-group, VIII-group and Ib-group in the periodic table, wherein Mm is a composite of rare earth elements, comprising:

dipping particles of the hydrogen absorbing alloy in an acetic acid/acetate buffer solution or an aqueous solution of organic acid of pH 2 through pH 6 selected from the group consisting of formic acid, acetic acid, propionic acid, butyric acid, malonic acid, oxalic acid, acrylic acid, valeric acid, glycolic acid, citric acid, succinic acid, glutaric acid, lactic acid and tartaric acid, to selectively remove Al and the rare earth elements;

thereby forming a rich layer which contains the at least one transition metal at a percentage larger than the predetermined percentage and which does not peel off on a surface portion of the hydrogen absorbing alloy; and rinsing and drying.

6. A method of manufacturing a hydrogen absorbing electrode as set forth in claim 5, wherein the aqueous solution has a temperature of 20° to 90° C.

7. A method of manufacturing a hydrogen absorbing electrode as set forth in claim 6, wherein the aqueous solution has a temperature of 80° C. to 90° C.

8. A method of manufacturing a hydrogen absorbing electrode as set forth in claim 5, wherein in a first stage of the acid treatment process, a hydrogen absorbing alloy ingot is roughly ground and classified and further finely ground and classified, to prepare particles of the hydrogen absorbing alloy.

9. A method of manufacturing a hydrogen absorbing electrode as set forth in claim 8, wherein the hydrogen absorbing alloy particles prepared by finely grinding and classifying lie within a grain size range of 45 to 75 μm.

10. A hydrogen absorbing electrode made by the method of claim 5.

11. A hydrogen absorbing electrode as set forth in claim 10, wherein the transition metal is primarily Ni.

12. A hydrogen absorbing electrode as set forth in claim 10, wherein the aqueous solution has a temperature of 20° to 90° C.

13. A hydrogen absorbing electrode as set forth in claim 10, wherein the aqueous solution has a temperature of 80° C. to 90° C.

14. A hydrogen absorbing electrode as set forth in claim 10, wherein said dipping is in an acetic acid/acetate buffer solution.

15. A hydrogen absorbing electrode as set forth in claim 10, further comprising roughly grinding and classifying and further finely grinding and classifying a hydrogen absorbing alloy ingot to prepare the particles.

16. A hydrogen absorbing electrode as set forth in claim 15, wherein the particles have a grain size of 45 to 75 μm.

17. A method of manufacturing a hydrogen absorbing electrode comprising a hydrogen absorbing alloy which comprises Mm and Al and at least one transition metal selected from the group consisting of group VIIb, group VIII, and group Ib of the periodic table, wherein Mm is a composite of rare earth elements, comprising:

dipping particles of the hydrogen absorbing alloy in an acetic acid/acetate buffer solution or an aqueous solution of organic acid of pH 2 to pH 6 to thereby selectively remove Al and the rare earth elements; and rinsing and drying, wherein the organic acid is selected from the group consisting of formic acid, acetic acid, propionic acid, butyric acid, malonic acid, oxalic acid, acrylic acid, valeric acid, glycolic acid, citric acid, succinic acid, glutaric acid, lactic acid and tartaric acid and has a temperature of 80° C. to 90° C.

18. A hydrogen absorbing electrode comprising a hydrogen absorbing alloy which comprises Mm and Al and a predetermined percentage of at least one transition metal selected from the group consisting of VIIb-group, VIII-group and Ib-group in the periodic table, wherein Mm is a composite of rare earth elements, wherein a surface portion of the hydrogen absorbing alloy forms a layer which is depleted in aluminum and the rare earth metals, thereby being rich in the at least one transition metal.

* * * * *

UNITED STATES PATENT AND TRADEMARK OFFICE
CERTIFICATE OF CORRECTION

PATENT NO. : 5,935,732
DATED : August 10, 1999
INVENTOR(S) : Yuichi Matsumura; Takehito Bogauchi; Masuhiro Ohnishi; Kengo Furukawa; Hiroe Nakagawa; Toshiki Tanaka; Minoru Kuzuhara and Masahiko Oshitani It is certified that error appears in the above-identified patent and that said Letters Patent is hereby corrected as shown below:

On the title page: Item

--[63] Continuation of application No. 08/545,709, filed Oct. 23, 1995, which was the National Stage of International Application No. PCT/JP95/00262, filed February 23, 1995.--

Signed and Sealed this

Third Day of April, 2001

Attest:

NICHOLAS P. GODICI

Attesting Officer

Acting Director of the United States Patent and Trademark Office